April 28, 1970   A. MIZRAHI   3,509,460
HIGH IMPEDANCE, SELF-ZEROING, DC VOLTMETER CIRCUIT
Filed Nov. 1, 1967
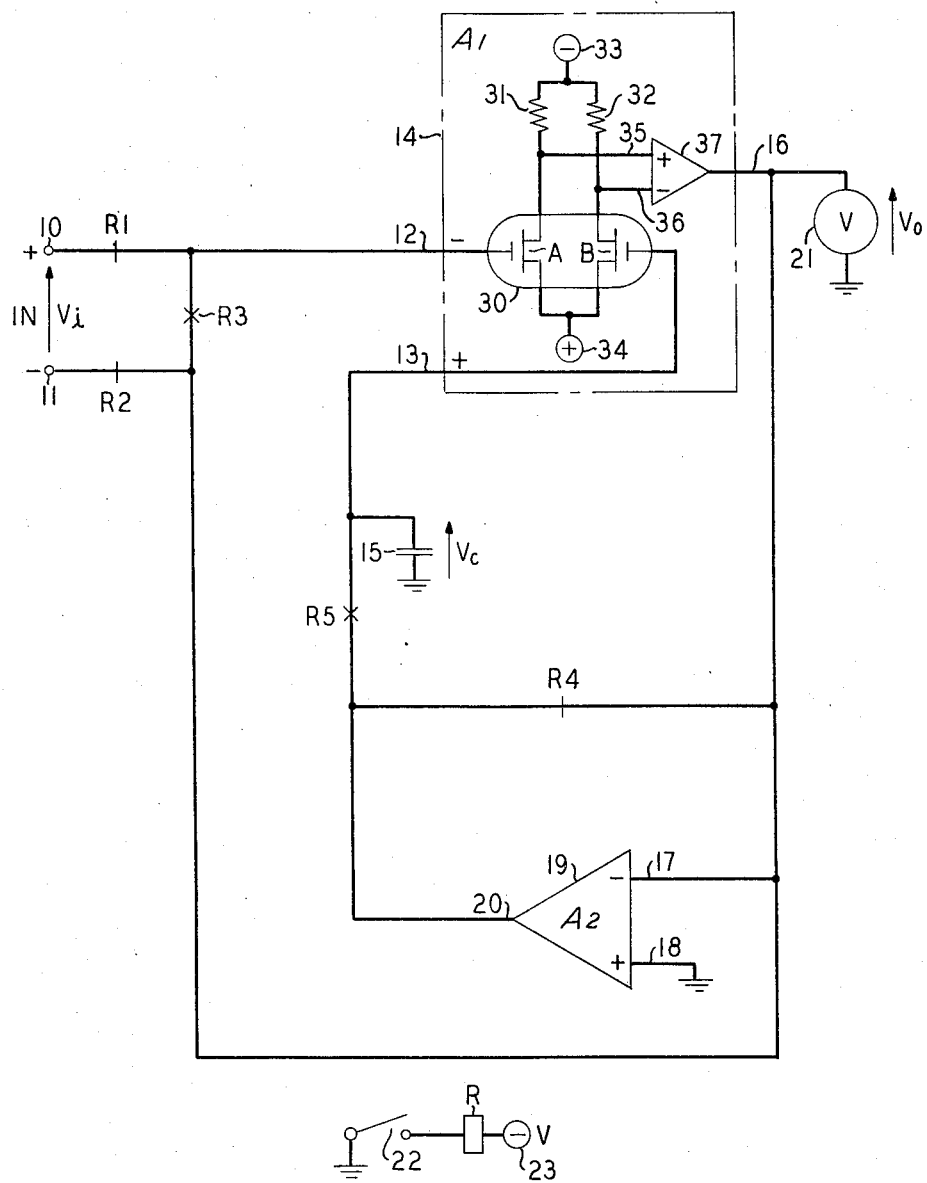
INVENTOR
*A. MIZRAHI*
BY
*Daniel D. Dubosky*
ATTORNEY United States Patent Office 3,509,460
Patented Apr. 28, 1970

3,509,460
HIGH IMPEDANCE, SELF-ZEROING,
DC VOLTMETER CIRCUIT
Albert Mizrahi, Mountain View, Calif., assignor to Bell Telephone Laboratories, Incorporated, Murray Hill, N.J., a corporation of New York
Filed Nov. 1, 1967, Ser. No. 679,768
Int. Cl. G01r 1/00; H03f 1/02
U.S. Cl. 324—111          8 Claims

ABSTRACT OF THE DISCLOSURE

A DC voltage to be measured is applied between one input of a high input impedance, high gain differential amplifier and the amplifier output which in turn is connected through a DC meter to ground. To zero the circuit, a relay is operated whose contacts disconnect any applied input DC voltage, connect the first input directly to the output of the differential amplifier, and further connect a second high gain amplifier between the above-mentioned output and the second input of the differential amplifier. The feedback provided through this second high gain amplifier develops a zeroing potential at the second input. A high quality capacitor connected between the second input and ground maintains this zeroing potential during the measurement mode when the voltage to be measured is applied and the second high gain amplifier is removed from the circuit.

BACKGROUND OF THE INVENTION

In order to provide a high impedance, DC voltage measuring circuit, a high input impedance amplifier is frequently connected between the voltage to be measured and a DC meter of the required accuracy. To eliminate the effect of variations in the amplifier gain, feedback is provided between the output of the amplifier and the input circuit to which the applied voltage has been connected. Although gain variations can be controlled in this way by the use of feedback, a DC potential may still occur at the output of the amplifier with zero volts at the input thereby causing an offset voltage for each voltage indication on the meter connected to the output. In order to provide a means for adjusting the output potential to zero when a signal of zero volts is applied at the input, a differential amplifier having two inputs has been utilized in prior art circuits with the voltage to be measured connected to one of the inputs of the differential amplifier and a manually variable voltage applied to the other input of the differential amplifier. With zero volts applied at the circuit input, the operator of such a circuit is then required to manually adjust the potential at the second input of the differential amplifier until the meter at the output reads zero. This procedure not only causes a strain on the operator, but also introduces the possibility of an additional error into the measurement.

Accordingly, one object of the present invention is to measure DC voltages in an ultra-high impedance circuit with an accuracy dictated solely by that of the meter which is used.

Another object of the present invention is to zero a DC voltage measuring circuit without requiring any manual adjustment on the part of the operator.

SUMMARY OF THE INVENTION

These and other objects are attained in accordance with the present invention wherein a DC meter is connected between ground and the output of a high gain differential amplifier having two ultra-high impedance inputs. Even though an imbalance exists between the two inputs of the differential amplifier, the meter will correctly read the potential applied between one of the two inputs and the output provided the proper zeroing potential is applied to the second of the two inputs. In order to establish a zeroing potential at the second input, relay contacts are caused to connect said one of the two inputs to the output and to further connect a second high gain amplifier between the output and the second one of the two inputs. A high quality capacitor connected between the second input and ground maintains the zeroing potential during the measurement mode of operation when the relay is not operative and and the second high gain amplifier is removed from the circuit.

BRIEF DESCRIPTION OF THE DRAWING

Other objects and many of the attendant advantages of the invention will be more readily appreciated when the following detailed description is read in conjunction with the single figure of the accompanying drawing in which a schematic block diagram of one embodiment of the present invention is shown.

DETAILED DESCRIPTION

In the figure, a DC voltage to be measured is applied between input terminals 10 and 11 with the positive polarity applied to input terminal 10. During the measurement mode, input terminal 10 is connected through a normally closed contact R1 of a relay R (shown in detached contact form) to the inverting input 12 of a high gain, ultra-high input impedance differential amplifier 14. The other input terminal 11 is connected through a normally closed contact R2 to output 16 of differential amplifier 14. A DC meter 21 having the required accuracy is connected between output 16 and ground potential.

In order to obtain an ultra-high input impedance, amplifier 14 may be made up of any one of a number of currently available operational amplifiers with an insulated gate field effect transistor (FET) connected to each input of the operational amplifier as shown in FIG. 1. Each insulated gated FET (30A or 30B) may be one-half of a dual channel, enhancement mode silicon insulated gate field effect transistor 30 of the type sold by General Instrument Corporation under the number MEM 550. Inputs 12 and 13 are directly connected to the gates of FET 30A and 30B, respectively, providing an input impedance for amplifier 14 of at least $10^{10}$ ohms. The sources of FET 30A and 30B are directly connected to a positive potential source 34, and the drains of FET 30A and 30B are connected through load resistors 31 and 32, respectively, to a negative potential source 33. The drains of FET 30A and 30B are also connected to inputs 35 and 36 of a differential amplifier 37. Amplifier 37, unlike the over-all differential amplifier 14 of which it is a part, need not have an ultra-high input impedance. Differences between the A and B halves of FET 30 will result in an imbalance between the two inputs 12 and 13 of amplifier 14, the degree of which may change with changes in the environmental conditions surrounding the FET. In the analysis to follow, this imbalance and any unbalance which exists in amplifier 37 can be considered as a DC source in series with input 12 with its positive end connected toward the gate of FET 30A and having a magnitude of $\xi_1$ volts.

Designating $V_i$ as the voltage applied to input terminals 10 and 11, $A_1$ as the amplification of amplifier 14 between each of its inputs 12 and 13, $V_c$ as the voltage applied to input 13 with respect to ground, and $\xi_1$ as a voltage source in series with input 12 representing an imbalance which exists between the two inputs of amplifier 14, the output voltage across meter 21, $V_o$, can be represented by the following equation:

$$V_o = A_1[V_c - (V_i + \xi_1 + V_o)]$$

which reduces to $$V_o = -V_1 + (V_c - \xi_1) \text{ where } A_1 \gg 1$$

Therefore, if $V_c = \xi_1$, $V_o = -V_1$. Hence, if the correct zeroing potential ($V_c = \xi_1$) has been previously applied to the noninverting input terminal 13 of differential amplifier 14, the magnitude of the DC voltage connected between input terminals 10 and 11 will be correctly read on meter 21. Any variations in the gain of amplifier 14 are prohibited from producing an effect on the output voltage indicated by the meter by virtue of the feedback provided by the connection of output 16 back to input terminal 11.

In order to provide the correct zeroing potential to input 13, relay R is operated and the contacts of relay R cause the elements of the circuit to be rearranged in a circuit configuration different from that which is used during the measurement mode. By closing switch 22, relay R is energized by the potential from source 23, and input 12 of amplifier 14 is connected through normally open contact R3 to output 16. The normally closed contacts R1 and R2 which are connected in series with input terminals 10 and 11, respectively, are opened when relay R is operated and thereby prevent any potential source which has been connected to the input terminals from being shorted through contact R3. Relay R should, of course, be chosen to provide a break-before-make type contact operation. In addition, operation of relay R causes a high gain amplifier 19 to be connected between output 16 and input 13 of amplifier 14 which in combination with the connection of input 12 to output 16 causes a zeroing potential to be developed at input 13 to counteract the effect of any imbalance between the two inputs of amplifier 14.

The short circuit normally provided through contact R4 between an inverting input 17 of a high gain amplifier 19 and its output 20 maintains output 20 at a reasonable value of voltage during the measurement mode of operation. Amplifier 19, like amplifier 37, may also be a differential amplifier but with its noninverting input 18 connected to ground potential. Unlike amplifier 37, however, amplifier 19 as pointed out hereinafter should have a low degree of unbalance between its two inputs. With relay R energized, output 20 of amplifier 19 is connected through a normally open contact R5 to input 13 of amplifier 14.

Again assuming that $\xi_1$ is the magnitude of a voltage source in series with input 12 representing an imbalance which exists between the two inputs of amplifier 14, the output voltage across meter 21, $V_o$, can be represented for the circuit with relay R energized by the following equation:

$$V_o = A_1[V_c - (V_o + \xi_1)]$$

$$V_o = \frac{A_1(V_c - \xi_1)}{1 + A_1} = (V_c - \xi_1) \text{ since } A_1 \gg 1$$

Amplifier 19, like amplifier 37, need not have an ultra-high impedance as does amplifier 14, and therefore may be chosen to have a negligible amount of imbalance as compared with amplifier 14. Nevertheless, some finite amount of imbalance may exist in amplifier 19, and in order to determine what effect it may have on the output voltage, it will be represented in the following equations by a voltage source in series with input 17 having a magnitude of $\xi_2$ volts. Hence, the voltage at output 20 across capacitor 15 may be represented by the following equation:

$$V_c = -A_2(V_o + \xi_2)$$

Substituting for $V_o$ we obtain, $$V_c = -A_2[(V_c - \xi_1) + \xi_2]$$

$$V_c = \frac{A_2(\xi_1 - \xi_2)}{1 + A_2} = (\xi_1 - \xi_2) \text{ since } A_2 \gg 1$$

As indicated hereinabove, amplifier 19 is chosen so that $\xi_2$ is negligible as compared with $\xi_1$, the magnitude of the voltage source representing the imbalance in amplifier 14.

As further indicated hereinabove, $\xi_1$ is the zeroing potential which is required at input 13 in order to counteract the effect of an unbalanced condition on the output voltage during the measurement mode of operation when relay R is not energized. To maintain the zeroing potential at input 13 during the measurement mode, a high quality, low leakage capacitor 15 is connected between input 13 and ground.

During the measurement mode with a voltage of $(\xi_1 - \xi_2)$ across capacitor 15, the output voltage may be represented by the following equation:

$$V_o = A_1[(\xi_1 - \xi_2) - (V_1 + \xi_1 + V_o)]$$

which for $A_1 \gg 1$ reduces to $$V_o = -(V_1 + \xi_2)$$

Hence, the imbalance of amplifier 19 need only be negligible with respect to the accuracy with which the input voltage can be measured by voltmeter 21 even though a significant unbalance exists in amplifier 14 due to the insulated gate FET input stages which have been introduced to provide an ultra-high input impedance.

In summary, the feedback arrangement provided after the operation of relay R through amplifiers 14 and 19 causes amplifier 19 to develop a voltage at input 13 such that the voltage at output 16 during the measurement mode will be equal in magnitude to the voltage applied to input terminals 10 and 11 even though a significant DC unbalance exists between the two channels of the differential amplifier. If no inequalities exist between the two channels represented by inputs 12 and 13, this potential presented at input 13 will, of course, be substantially equal to zero. Differences between the input circuits containing the insulated gate FET's, however, usually exist and are frequently accentuated with changes in temperature and other environmental changes.

What is claimed is:

1. In combination, a differential amplifier means having an output and two high impedance inputs, a voltmeter connected between said output and a reference potential, means for coupling a voltage to be measured between the first of said two inputs and said output, means for eliminating the effect of any imbalance between said two inputs on the reading provided by said voltmeter, the last-mentioned means comprising a capacitor connected between the second of said two inputs and said reference potential, means for directly connecting said first of said two inputs to said output, a high gain amplifier, and means for connecting said high gain amplifier between said output and said second of two inputs.

2. The combination as defined in claim 1 wherein said differential amplifier includes at least two field effect transistors each of which has an insulated gate electrode, each of said two inputs being directly connected to the gate electrode of one of said two field effect transistors.

3. The combination as defined in claim 1 wherein the second of said two inputs is the noninverting input of said differential amplifier, and said high gain amplifier is a second differential amplifier with its inverting input connected to said output and its noninverting input connected to said reference potential.

4. In a DC voltmeter circuit wherein a differential amplifier with two inputs and an output has a voltage to be measured connected between a first of said two inputs and the output and a DC voltmeter connected between said output and a reference potential, means for eliminating the effect of any imbalance between said two inputs on the reading provided by said voltmeter, the last-mentioned means comprising a switching means, a high gain amplifier, means responsive to said switching means for disconnecting the first input from the voltage to be measured and connecting the first input to the output and for connecting said high gain amplifier between said output and the other one of said two inputs of said differential amplifier, and a voltage storage means connected between said other one of said two inputs and said reference potential.

5. A voltmeter circuit as defined in claim 4 wherein said differential amplifier includes at least two field effect transistors each of which has an insulated gate electrode, each of said two inputs being directly connected to the gate electrode of said two field effect transistors.

6. A circuit as defined in claim 4 wherein said other one of said two inputs is the noninverting input of said differential amplifier and said high gain amplifier is a second differential amplifier with its inverting input connected to said output and its noninverting input connected to said reference potential.

7. A circuit for measuring the DC voltage between first and second input terminals, said circuit comprising a differential amplifier having an inverting and a noninverting input and an output, a DC voltmeter connected between said output and ground, a relay, means for connecting said first input terminal through a first normally closed contact of said relay to said inverting input, means for connecting said second input terminal through a second normally closed contact of said relay to said output, means for connecting said inverting input through a first normally open contact of said relay to said output, an inverting high gain amplifier having an input and output, means for connecting the input of said high gain amplifier to said output, means for connecting the output of said high gain amplifier through a second normally open contact to said noninverting input of said differential amplifier, a capacitor connected between said noninverting input and ground, and means for operating said relay, whereby a voltage is developed across said capacitor when said relay is operated such that zero volts will be presented to said DC voltmeter when zero volts are presented to said input terminals and said relay is released.

8. A circuit as defined in claim 7 wherein said differential amplifier includes at least two field effect transistors each of which has an insulated gate electrode, the gate electrode of one of said two field effect transistors being the inverting input of said differential amplifier, and the gate electrode of the other of said two transistors being the noninverting input of said differential amplifier.

References Cited
UNITED STATES PATENTS

| | | | |
|---|---|---|---|
| 2,709,205 | 5/1955 | Colls | 330—9 |
| 2,741,668 | 4/1956 | Iffland | 330—9 |
| 2,754,374 | 7/1956 | Enright | 330—9 |
| 2,970,266 | 1/1961 | Molloy et al. | 330—9 XR |
| 3,147,446 | 9/1964 | Wittenberg | 330—9 |
| 3,222,599 | 12/1965 | Gewirtz | 324—123 |
| 3,370,242 | 2/1968 | Offner | 330—9 |

RUDOLPH V. ROLINEC, Primary Examiner

E. F. KARLSEN, Assistant Examiner

U.S. Cl. X.R.
324—130; 330—9